(12) United States Patent
Ooba et al.

(10) Patent No.: US 8,255,187 B2
(45) Date of Patent: Aug. 28, 2012

(54) REMOTE MONITORING DIAGNOSTIC SYSTEM

(75) Inventors: Yoshikazu Ooba, Hachioji (JP); Yoshiro Seki, Fuchu (JP); Kimito Idemori, Saitama (JP); Shuichiro Kobayashi, Tokyo (JP); Hiroyuki Oohashi, Kawasaki (JP); Katsuhiro Sumi, Hino (JP); Yutaka Iino, Kawasaki (JP); Kenji Mitsumoto, Kawasaki (JP); Yoshiaki Fujita, Fuchu (JP); Tadashi Shudo, Asaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 416 days.

(21) Appl. No.: 12/209,553

(22) Filed: Sep. 12, 2008

(65) Prior Publication Data

US 2009/0019319 A1 Jan. 15, 2009

Related U.S. Application Data

(63) Continuation of application No. PCT/JP2008/050293, filed on Jan. 11, 2008.

(30) Foreign Application Priority Data

Jan. 16, 2007 (JP) ................................ 2007-007246

(51) Int. Cl.
G06F 11/30 (2006.01)

(52) U.S. Cl. .......................................................... 702/188

(58) Field of Classification Search .................... 702/81, 702/82, 119, 122, 123, 182–184, 188; 709/200, 709/224–226; 717/120; 726/12; 463/20
See application file for complete search history.

(56) References Cited

U.S. PATENT DOCUMENTS

| 6,553,336 | B1 * | 4/2003 | Johnson et al. | 702/188 |
|---|---|---|---|---|
| 7,346,891 | B2 * | 3/2008 | Anand et al. | 717/107 |
| 2003/0177383 | A1 * | 9/2003 | Ofek et al. | 713/200 |
| 2004/0006761 | A1 | 1/2004 | Anand et al. | |

FOREIGN PATENT DOCUMENTS

| JP | 8-83173 | 3/1996 |
|---|---|---|
| JP | 8-83173 A | 3/1996 |
| JP | 2000-47912 | 2/2000 |

(Continued)

OTHER PUBLICATIONS

International Search Report issued by the Japanese Patent Office on Mar. 4, 2008, for International Application No. PCT/JP2008/050293.
Tsukui, R. et al., Megatrend in Supervisory/Control and Protective Relay Systems for Power Systems; vol. 54 No. 6, pp. 26-29. (1999).
Hasegawa, Y. et al., Intranet-Based Supervisory Control System for Power Systems; vol. 54 No. 6, pp. 30-33. (1999).
Sekiguchi, K. et al., Power System Protection and Control System Applying Intranet Technology; vol. 54 No. 6, pp. 34-37. (1999).
International Preliminary Report from the International Bureau of WIPO on Jan. 11, 2008, for International application No. PCT/JP2008/050293 (6 pages).
Notice of Reasons for Rejection issued by Japanese Patent Office in Application No. 2007-007246, mailed Jan. 10, 2012.

*Primary Examiner* — Mohamed Charioui
(74) *Attorney, Agent, or Firm* — Finnegan, Henderson, Farabow, Garrett & Dunner, L.L.P.

(57) ABSTRACT

Disclosed is a remote monitoring diagnostic system in which a center and monitoring diagnostic units of a number of objects to be monitored are connected by a network. The center includes an algorithm forming unit for forming algorithms for monitoring, diagnosing, and operating each object to be monitored, a program group formation unit for forming monitoring, diagnostic, and operational programs from these algorithms, a transmitter for transmitting the programs in response to a request from the monitoring diagnostic unit, and a unit for forming information concerning prevention/maintenance form a diagnostic result and monitoring data from the monitoring diagnostic unit of each object to be monitored. The monitoring diagnostic unit of each object to be monitored includes a mobile program execution processor for executing the corresponding object to be monitored, and a transmitter for transmitting monitoring data to the center.

3 Claims, 12 Drawing Sheets

FOREIGN PATENT DOCUMENTS

| | | |
|---|---|---|
| JP | 2000-47912 A | 2/2000 |
| JP | 2000-56823 | 2/2000 |
| JP | 2000-56823 A | 2/2000 |
| JP | 2001 282554 | 10/2001 |
| JP | 2002-073154 | 3/2002 |
| JP | 2003-114294 | 4/2003 |
| JP | 2004-5230 | 1/2004 |
| JP | 2004-5230 A | 1/2004 |
| JP | 2004-005230 * | 8/2004 |
| JP | 3621935 | 11/2004 |
| JP | 2005-141391 | 6/2005 |
| JP | 2005-332068 | 12/2005 |

* cited by examiner

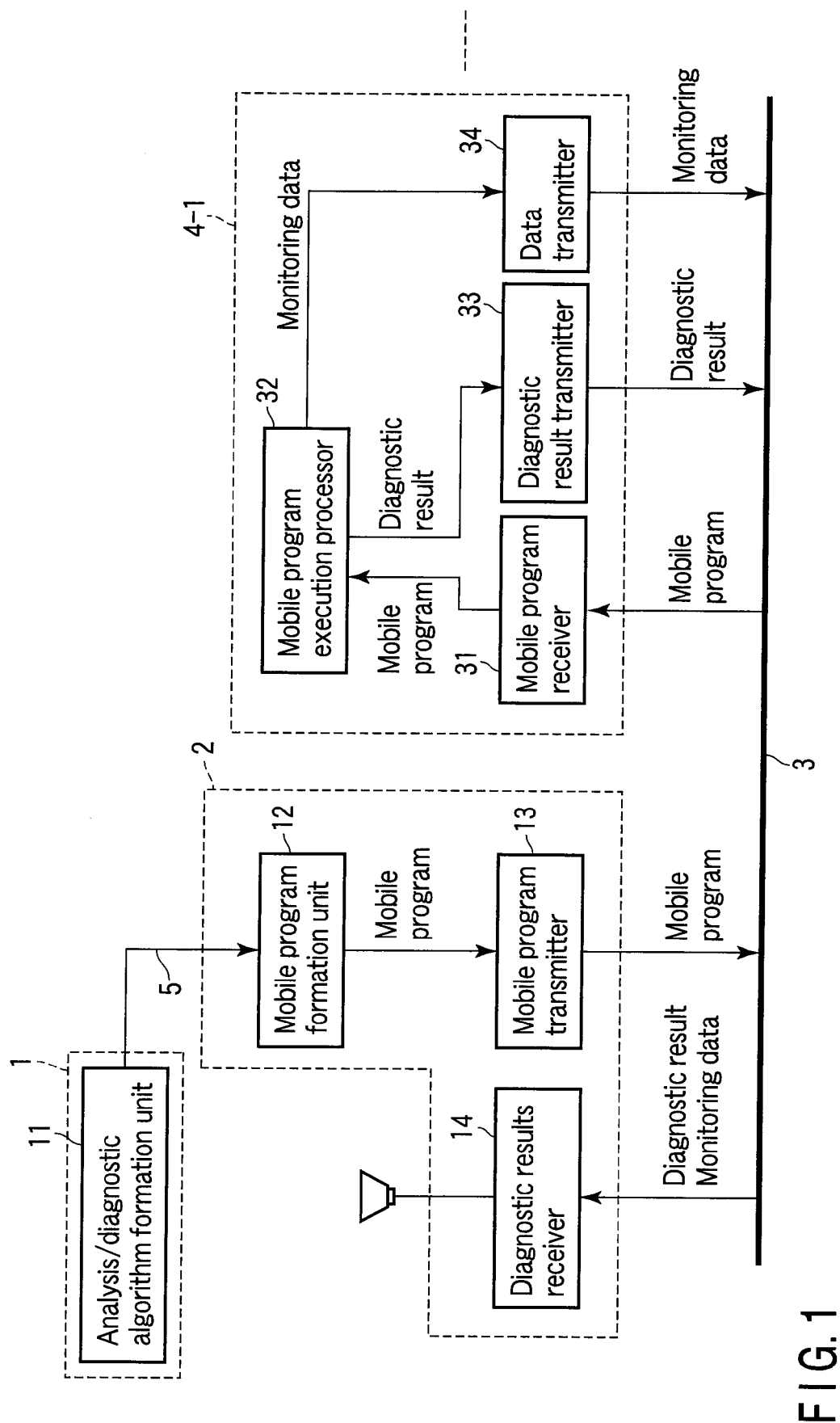
F I G. 1

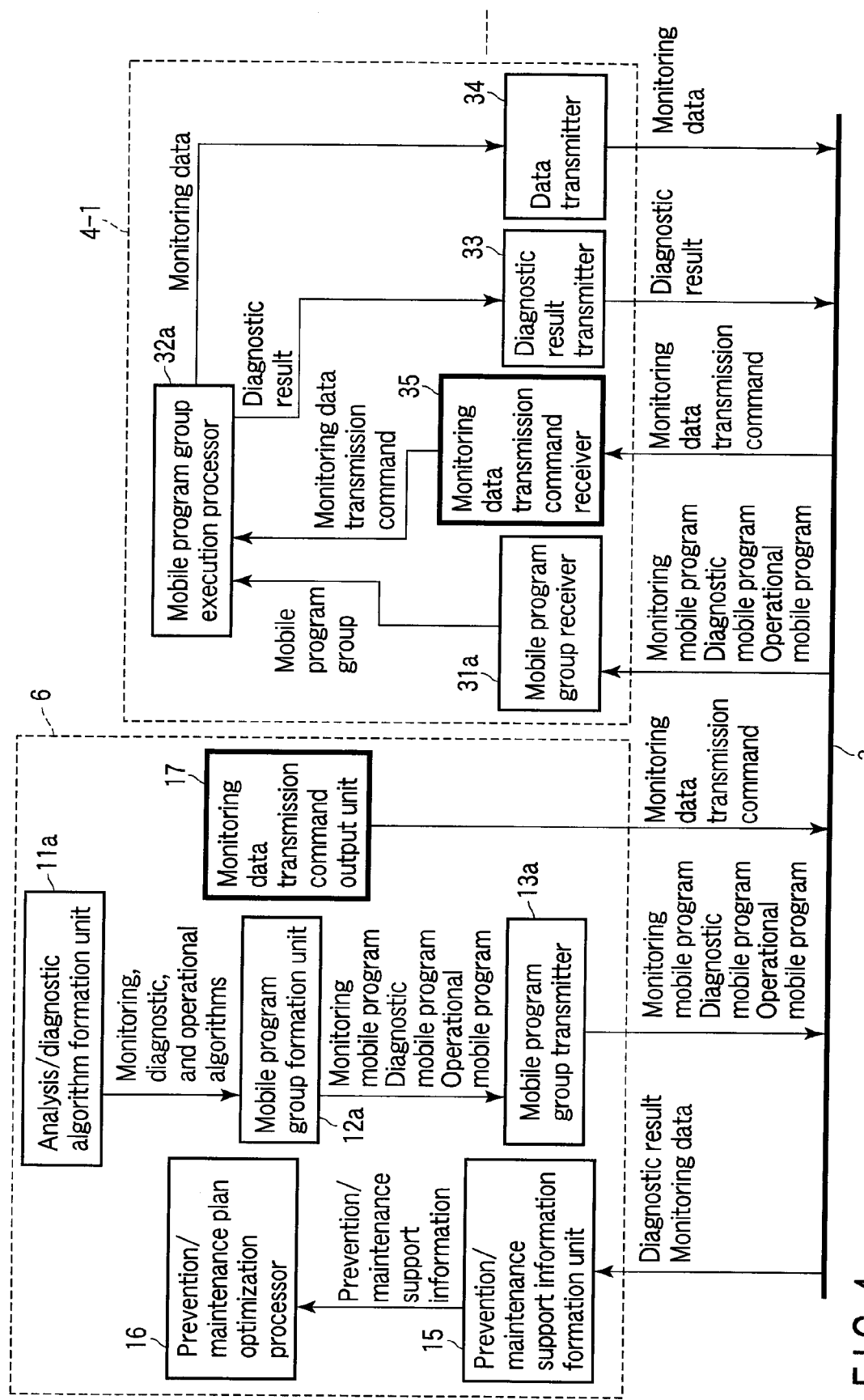
F I G. 4

REMOTE MONITORING DIAGNOSTIC SYSTEM

CROSS REFERENCE TO RELATED APPLICATIONS

This is a Continuation Application of PCT Application No. PCT/JP2008/050293, filed Jan. 11, 2008, which was published under PCT Article 21(2) in Japanese.

This application is based upon and claims the benefit of priority from prior Japanese Patent Application No. 2007-007246, filed Jan. 16, 2007, the entire contents of which are incorporated herein by reference.

BACKGROUND OF THE INVENTION

1. Field of the Invention

The present invention relates to a remote monitoring diagnostic system for monitoring and diagnosing a large number of objects to be monitored having various processing forms or performances.

2. Description of the Related Art

Conventionally, techniques adopting various remote monitoring methods have been developed and proposed as remote monitoring diagnostic systems for monitoring and controlling objects to be monitored in remote places. Several conventional remote monitoring diagnostic systems will be explained below.

One remote monitoring diagnostic system is a power system protection control system for performing remote operation and remote maintenance, and is a method in which a controller of an object to be monitored is connected to a remote monitoring center by an intranet and monitored by using a web page formed by HTML (e.g., non-patent references 1 to 3).

Another remote monitoring diagnostic system includes a remote monitoring point, plant control system, and plant to be monitored, and has an arrangement in which a monitoring diagnostic program installed in the remote monitoring point cooperates with a plant control program installed in the plant control system, and monitors and diagnoses the plant on the basis of data supplied from the plant control system (e.g., patent reference 1).

Still another remote monitoring diagnostic system is a system for monitoring, diagnosing, and maintaining a plurality of power generation plants from a remote place (e.g., patent reference 2).

Non-patent reference 1: "Innovative Power System Monitoring Control/Protection System", Ryoichi Tsukui, Fumio Masuda, and Kuniaki Suzuki, Toshiba Review, Vol. 54, No. 6, pp. 26-29, 1999.

Non-patent reference 2: "Intranet Applied Power System Monitoring Control System", Yoshiro Hasegawa, Yosio Ebata, and Hideki Hayashi, Toshiba Review, Vol. 54, No. 6, pp. 30-33, 1999.

Non-patent reference 3: "Application of Intranet Techniques to Power System Protection Control System", Katuhiko Sekiguchi, Shoji Takenaka, and Yoshihiro Sirota, Toshiba Review, Vol. 54, No. 6, pp. 34-37, 1999.

Patent reference 1: Japanese Patent No. 3621935

Patent reference 2: Jpn. Pat. Appln. KOKAI Publication No. 2003-114294

BRIEF SUMMARY OF THE INVENTION

The remote monitoring diagnostic systems as described above monitor plants such as power systems, and mainly use data communication by intranets. Accordingly, the following problems are pointed out.

(1) Some remote monitoring diagnostic systems monitor and diagnose tens of thousands of objects to be monitored. However, it is difficult to apply this form to a system in which a monitoring diagnostic program in a remote monitoring point and a plant control program in a plant control system cooperate with each other by maintaining a one-to-one relationship.

(2) Although objects to be monitored are required to have various processing forms or performances, it is difficult to monitor and diagnose these objects having a number of processing forms or performances.

(3) As described above, the conventional remote monitoring diagnostic systems mainly use data communication by intranets. Therefore, it is difficult to apply these conventional systems to systems using the Internet through public lines.

It is, therefore, an object of the present invention to provide a remote monitoring diagnostic system that adopts an architecture changeable in accordance with the states of a large number of objects to be monitored, and can use only a necessary program by independently handling monitoring, diagnostic, and operational programs, thereby solving the above problems.

A remote monitoring diagnostic system according to an aspect of the present invention is a remote monitoring diagnostic system in which a center and monitoring diagnostic units each installed in an object to be monitored are connected by a communication network, and which monitors and diagnoses each object to be monitored, wherein the center comprises analysis/diagnostic algorithm forming means for forming an algorithm for performing diagnosis corresponding to a processing form or performance of each object to be monitored, on the basis of a result of analysis performed on data or specifications of the object beforehand, mobile program forming means for forming a mobile program for diagnosing each object to be monitored, on the basis of the algorithm formed by the analysis/diagnostic algorithm forming means, mobile program transmission means for transmitting the mobile program formed by the mobile program forming means to each monitoring diagnostic unit across the communication network, and diagnostic result reception means for receiving a diagnostic result or monitoring data transmitted from the monitoring diagnostic unit of each object to be monitored, and generating an alarm or abnormality notification if abnormality is found, and each monitoring diagnostic unit comprises mobile program reception means for receiving the mobile program transmitted from the center, mobile program execution processing means for executing the received mobile program on a corresponding object to be monitored, and transmission means for transmitting monitoring data of the object to be monitored and a diagnostic result of the monitoring data to the center across the communication network.

As the center, there may be provided, instead of the diagnostic result reception means, prevention/maintenance support information forming means for receiving monitoring data and a diagnostic result of a object to be monitored transmitted from the transmission means of each monitoring diagnostic unit, and forming maintenance support information of each object to be monitored on the basis of the monitoring data and the diagnostic result, and prevention/maintenance plan optimization processing means for making an optimum maintenance plan by using the prevention/maintenance support information formed.

A remote monitoring diagnostic system according to the second aspect of the present invention has an arrangement in which the analysis/diagnostic algorithm forming means of the center individually forms mobile algorithms for monitoring, diagnosing, and operating each object to be monitored, on the basis of a result of analysis performed on data or specifications of the object beforehand, the mobile program forming means of the center forms a monitoring mobile program, a diagnostic mobile program, and an operational mobile program for monitoring, diagnosing, and operating each object to be monitored, on the basis of the algorithms for monitoring, diagnosis, and operation, and transmits one or more of the monitoring mobile program, the diagnostic mobile program, and the operational mobile program via the mobile program transmission means to the monitoring diagnostic unit of each object to be monitored via the mobile program transmission means and the communication network, in response to a request from the monitoring diagnostic unit, and the mobile program execution processing means of each monitoring diagnostic unit acquires monitoring data of a corresponding object to be monitored on the basis of execution of the monitoring mobile program received by the mobile program reception means, acquires a diagnostic result of monitoring data of the object to be monitored on the basis of execution of the diagnostic mobile program, and operates the object to be monitored on the basis of execution of the operational mobile program.

A remote monitoring diagnostic system according to the third aspect of the present invention has an arrangement in which the center forms the monitoring mobile program, the diagnostic mobile program, and the operational mobile program as a monitoring mobile agent, a diagnostic mobile agent, and a operational mobile agent.

A remote monitoring diagnostic system according to the fourth aspect of the present invention has an arrangement in which the center comprises a program/data transmitter-receiver, or a security-sensitive program/data transmitter-receiver including an authenticating function and an encrypting function and sensitive to transmission security, obtained by collecting, into one package, at least transmission means for transmitting the mobile program (mobile agent) and reception means for receiving the diagnostic result and the monitoring data, and each monitoring diagnostic unit comprises a program/data transmitter-receiver, or a security-sensitive program/data transmitter-receiver including an authenticating function and an encrypting function and sensitive to transmission security, obtained by collecting, into one package, at least reception means for receiving the mobile program and transmission means for transmitting the diagnostic result and the monitoring data.

BRIEF DESCRIPTION OF THE SEVERAL VIEWS OF THE DRAWING

FIG. 1 is a block diagram of a remote monitoring diagnostic system according to the first embodiment of the present invention;

FIG. 4 is a block diagram of a remote monitoring diagnostic system according to the fourth embodiment;

DETAILED DESCRIPTION OF THE INVENTION

Figure 2:
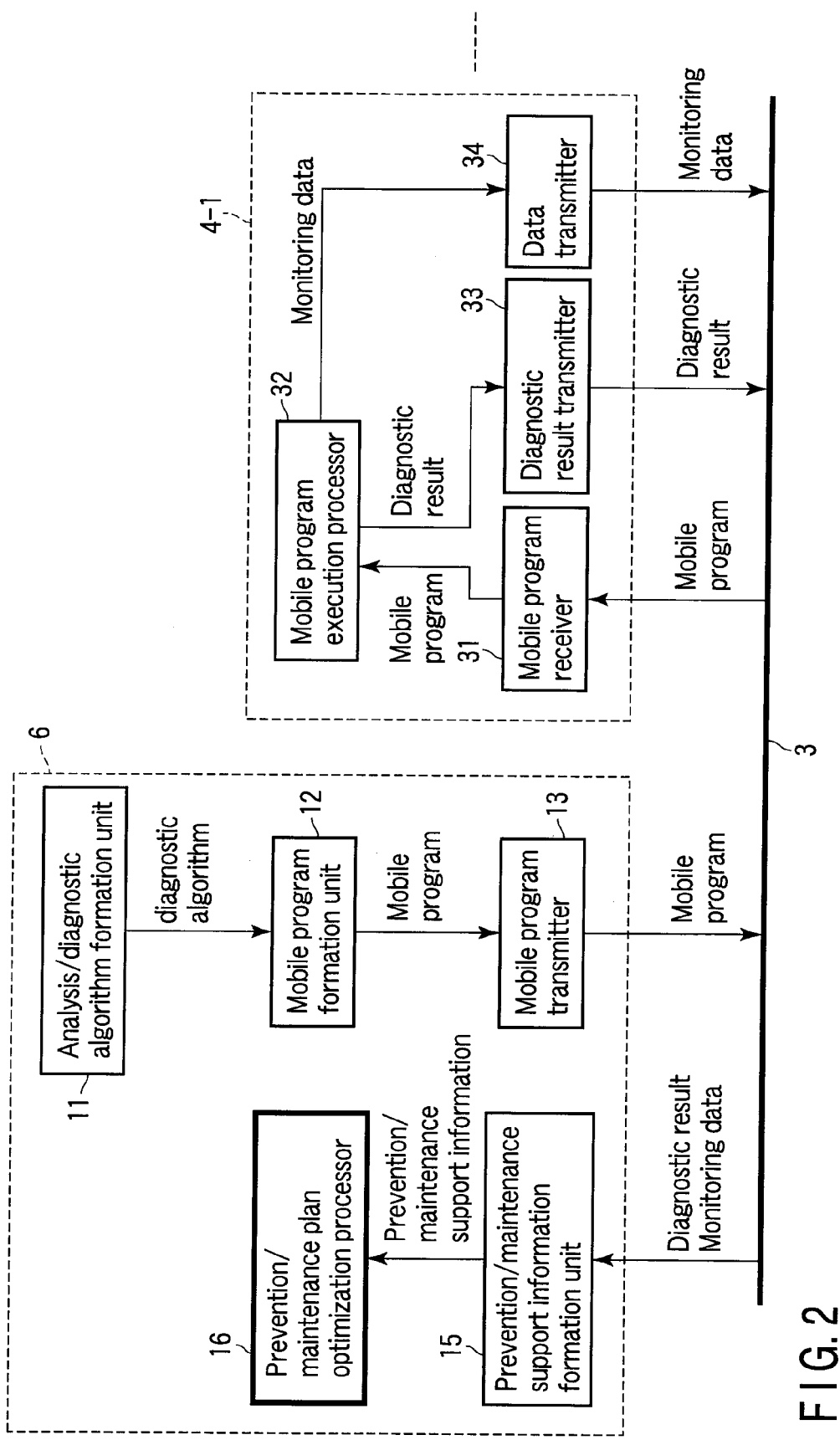
FIG. 2 is a block diagram of a remote monitoring diagnostic system according to the second embodiment.

Embodiments of the present invention will be explained below with reference to the accompanying drawings.

(First Embodiment)

FIG. 1 is a block diagram of a remote monitoring diagnostic system according to this embodiment.

This remote monitoring diagnostic system has an analysis center 1, monitoring center 2, and monitoring diagnostic units 4-1, . . . installed in one-to-one correspondence with objects to be monitored. The monitoring center 2 and the monitoring diagnostic units 4-1, . . . of a large number of objects to be monitored are connected to a communication network 3. Also, the analysis center 1 and monitoring center 2 are connected by an intranet 5. Note that the analysis center 1 and monitoring center 2 function as a center.

The analysis center 1 has an analysis/diagnostic algorithm formation unit 11. The analysis/diagnostic algorithm formation unit 11 forms a diagnostic algorithm using a source code that defines, e.g., a diagnostic procedure for solving a problem corresponding to the processing form or performance of each object to be monitored. For this purpose, data and specifications concerning each object to be monitored are obtained beforehand, and a diagnostic algorithm for estimating and diagnosing the state of the object is formed. The processing form depends on the contents or purpose of processing of the monitoring diagnostic unit of each object to be monitored. The performance depends on the capability of the monitoring diagnostic unit of each object to be monitored, e.g., the processing speed or rotational speed of the monitoring diagnostic unit.

Examples of the data obtained in advance in relation to each object to be monitored are the measured value and command value of each sensor installed in the object. For example, when a motor is used in an object to be monitored, the data are a command value given to the motor, the measured value of the rotational speed, and the like. Examples of the specifications obtained beforehand in relation to each object to be monitored are the specifications of parts and the like used in the object. For example, when a motor is used in an object to be monitored, the specifications are, e.g., the specifications of the motor.

Accordingly, the state of each object to be monitored is estimated from the data or specifications of the object, and an algorithm for diagnosis is formed. The diagnosis is performed on the basis of monitoring data of the object.

An example of the simplest diagnosis is an algorithm by which threshold values corresponding to monitoring data (e.g., a sensor measured value and operation command value) representing the state of an object to be monitored are preset, and a diagnostic result representing an alarm or abnormality notification is output if one or a plurality of types of monitoring data exceed the threshold values. When using a plurality of types of monitoring data, it is also possible to form an expression for evaluating the monitoring data by using each threshold value. For example, the diagnostic result is a low-level abnormality if a plurality of types of monitoring data exceed one threshold value, a medium-level abnormality if the plurality of types of monitoring data exceed two threshold values, and a high-level abnormality if the plurality of types of monitoring data exceed three or more threshold values.

Note that the diagnostic algorithm is formed by, e.g., an algorithm describing method such as a source file or set file using a programming grammar, or a describing method such as a flowchart, by using a PC or the like.

The monitoring center 2 includes a mobile program formation unit 12, mobile program transmitter 13, and diagnostic results receiver 14.

The mobile program formation unit 12 forms a diagnostic mobile program that operates in the monitoring diagnostic units 4-1, . . . of objects to be monitored, on the basis of the diagnostic algorithm formed by the analysis/diagnostic algorithm formation unit 11. The diagnostic mobile program is formed by adding, to a program for purely executing an algorithm, a subroutine for referring to input data (e.g., a mobile program), a subroutine for outputting a diagnostic result and the like, a subroutine for exchanging data with another program such as an OS, and the like. The output format of the diagnostic mobile program can be any format as long as it can be executed by the monitoring diagnostic unit 4 of an object to be monitored. Examples are a directly executable program file, and a file formed on the basis of a description language for forming a Web page or Soap (Simple object access protocol).

The mobile program transmitter 13 transmits the diagnostic mobile program formed by the mobile program formation unit 12 to the monitoring diagnostic unit, e.g., 4-1, of a corresponding object to be monitored. The mobile program is transmitted across the communication network 3.

An intranet or the Internet is used as the communication network 3. The simplest example of the transmission using the communication network 3 is the use of the TCP/IP protocol or SNMP.

The diagnostic results receiver 14 has functions of receiving the diagnostic result, monitoring data, and the like transmitted from the monitoring diagnostic units 4-1, . . . of objects to be monitored, and generating an alarm or abnormality notification on the basis of, e.g., the monitoring data or the diagnostic result indicating abnormality.

The monitoring diagnostic units 4-1, . . . of objects to be monitored each have a mobile program receiver 31, mobile program execution processor 32, diagnostic result transmitter 33, and data transmitter 34.

The mobile program receiver 31 receives a diagnostic mobile program transmitted from the mobile program transmitter 13 if identification data attached to the diagnostic mobile program indicates the address of the mobile program receiver 31, and stores the received program in an appropriate storage means (not shown).

The mobile program execution processor 32 executes the received diagnostic mobile program, performs diagnosis corresponding to the processing form or performance of an object to be monitored on the basis of the monitoring data of the object, and outputs the diagnostic result and monitoring data.

The diagnostic result transmitter 33 transmits the diagnostic result obtained by the mobile program execution processor 32 to the monitoring center 2 across the network 3. The data transmitter 34 similarly transmits the monitoring data indicating the result of execution by the mobile program execution processor 32 to the monitoring center 2 across the communication network 3. These diagnostic results and monitoring data are transmitted by using a protocol similar to the communication protocol used by the mobile program transmitter 13.

This embodiment as described above has the arrangement in which the analysis center 1 forms a diagnostic algorithm, and the monitoring center 2 forms a diagnostic mobile program, transmits the program to the monitoring object units 4-1, . . . , and receives the diagnostic results and the like. Therefore, necessary diagnostic mobile programs corresponding to the functions of individual special departments such as the analysis center 1 and monitoring center 2 scattered on, e.g., the Internet can be rapidly formed as optimum diagnostic mobile programs by making the most of the past experiences and the like, and readily provided to the monitoring diagnostic units 4-1, . . . of a number of objects to be diagnosed.

It is also possible to form a diagnostic mobile program corresponding to the processing form or performance of each object to be monitored, and improve the versatility and reliability of the remote monitoring diagnostic system. This allows the system to well deal with the replacement or change of an object to be monitored.

Note that in this embodiment, the analysis center 1 and monitoring center 2 are separately given their respective functions. If all necessary persons are in one place or need to be gathered in one place, however, the center may also have the analysis/diagnostic algorithm formation unit 11, mobile program formation unit 12, mobile program transmitter 13, and diagnostic results receiver 14.

(Second Embodiment)

FIG. 2 is a block diagram of a remote monitoring diagnostic system according to the second embodiment.

In this remote monitoring diagnostic system, a center 6 and monitoring diagnostic units 4, . . . of a number of objects to be monitored are connected by a communication network 3.

The center 6 has a prevention/maintenance support information formation unit 15 and prevention/maintenance plan optimization processor 16, in addition to an analysis/diagnostic algorithm formation unit 11, mobile program formation unit 12, and mobile program transmitter 13 explained in the first embodiment and shown in FIG. 1.

Note that the arrangements and processing contents of the analysis/diagnostic algorithm formation unit 11, the mobile program formation unit 12, the mobile program transmitter 13, and monitoring diagnostic units 4-1, . . . of the objects to be monitored are the same as those of the first embodiment, so a repetitive explanation will be omitted.

The prevention/maintenance support information formation unit 15 forms information for supporting prevention/maintenance on the basis of diagnostic results from diagnostic result transmitters 33 of the monitoring diagnostic units 4-1, . . . of the objects to be monitored, and monitoring data from a data transmitter 34. As the support for prevention/maintenance, information indicating inspection and replacement times of parts is formed from the diagnostic results. For example, a predicted inspection/replacement time for inspecting or replacing a part is determined in accordance with whether the abnormality is on a low, medium, or high level, on the basis of the diagnostic results, and output as prevention/maintenance support information together with the name of the part to be inspected or replaced. Also, on the basis of the diagnostic results and monitoring data, the deterioration of the constituent part of an object to be monitored or the decrease in capability of the object is detected, and prevention/maintenance support information representing the state of the deterioration of the constituent part of the object or the state of the decrease in capability of the object is output together with the part name.

The prevention/maintenance plan optimization processor 16 displays the prevention/maintenance support information formed by the prevention/maintenance support information formation unit 15. A human system, for example, makes an optimum prevention/maintenance plan in accordance with a predetermined message, and transfers the plan to a maintenance management room, part delivery center, and the like. For example, adjustment is performed on the basis of the predicted inspection/replacement time to avoid repetition of sites in different places already written in a schedule or the like of each month, the inspection period is shortened on the basis of the deterioration of constituent parts or the decrease in performance of an object to be monitored, and a message prompting replacement of a part is output if it is detected from the past experiences or the like that a fatal abnormality may occur in the part.

The state of an object to be monitored normally changes in many cases as monitoring and diagnosis are continued, so the initial plan may become unable to perform optimum inspection/maintenance and part replacement. Since, however, the embodiment as described above monitors and diagnoses an ever-changing status, the tendency of deterioration becomes clear, or the decrease in performance significantly appears. Accordingly, an optimum plan of inspection/maintenance and part replacement can be made.

It is also possible to make an optimum plan of inspection/maintenance and part replacement on the basis of the prevention/maintenance support information obtained from the diagnostic results of a number of objects to be monitored, while the geographical status, location, maintenance persons, and the like are taken into consideration.

(Third Embodiment)

Figure 3:
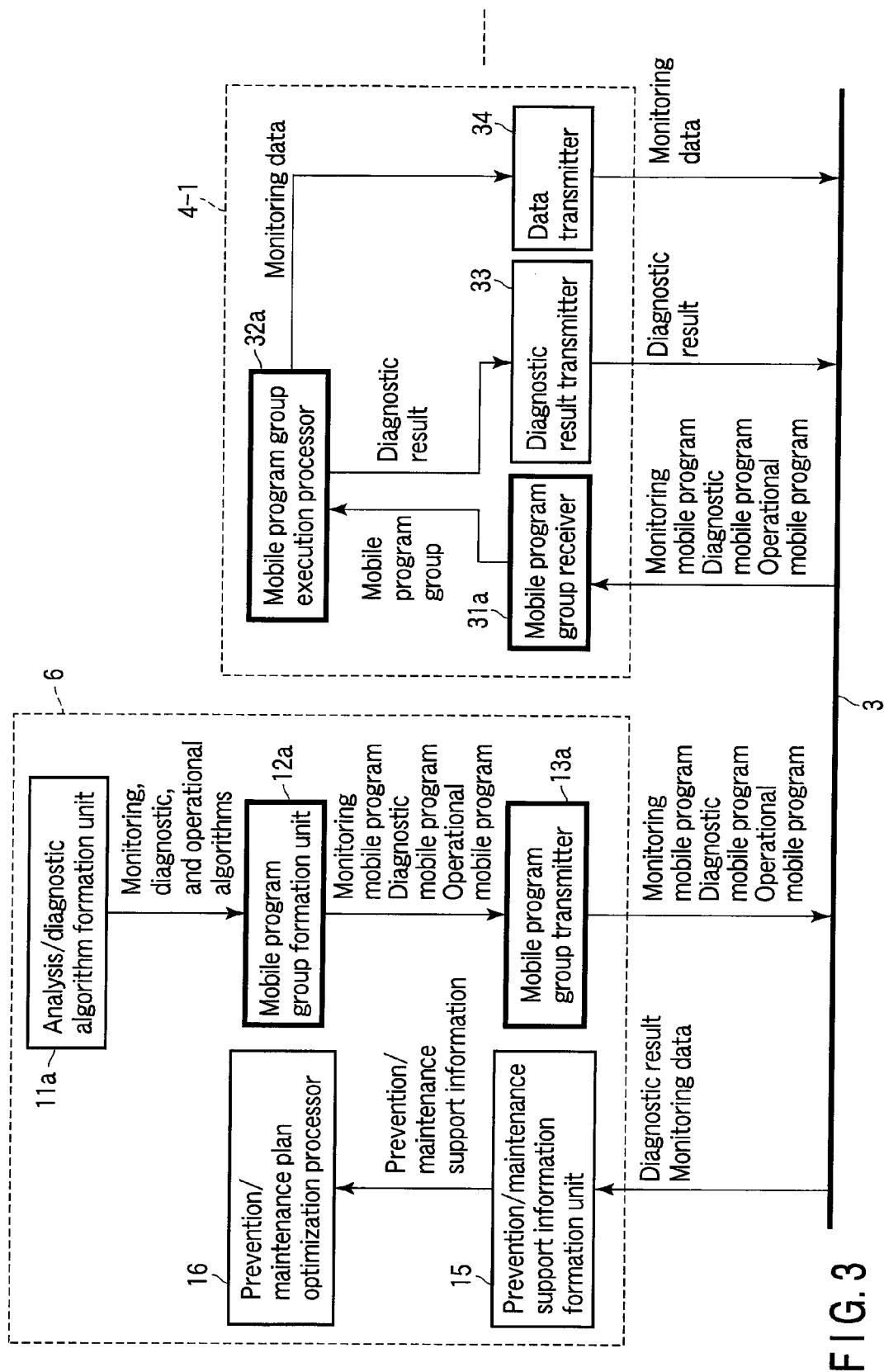
FIG. 3 is a block diagram of a remote monitoring diagnostic system according to the third embodiment.

FIG. 3 is a block diagram of a remote monitoring diagnostic system according to the third embodiment.

In this remote monitoring diagnostic system, a center 6 and monitoring diagnostic units 4-1, . . . of a number of objects to be monitored are connected by a communication network 3 as in the second embodiment.

The center 6 has an analysis/diagnostic algorithm formation unit 11a, mobile program group formation unit 12a, mobile program group transmitter 13a, prevention/maintenance support information formation unit 15, and prevention/maintenance plan optimization processor 16.

The analysis/diagnostic algorithm formation unit 11a forms not only a diagnostic algorithm as described previously, but also a monitoring algorithm and operational algorithm. The diagnostic algorithm is as described previously.

The monitoring algorithm is formed by a source code that defines, e.g., a monitoring procedure of solving a problem corresponding to the performance and processing form of each object to be monitored. For this purpose, data, specifications, and the like to be monitored concerning each object to be monitored are obtained beforehand, and a monitoring algorithm is formed by collecting necessary data of the object.

The simplest example is to monitor outputs from all sensors installed in objects to be monitored. Also, as an algorithm for transmission of monitoring data, an algorithm is formed by which only main monitoring data is transmitted to the center 6 in a normal state, other monitoring data is transmitted for every predetermined period, and the number of types of transmission data is increased as needed. This embodiment assumes, for example, that an algorithm is formed by taking account of the types of data to be transmitted in the normal state, and the types of data to be transmitted in accordance with each level, i.e., the types of data to be transmitted on an alarm level, and the types of data to be transmitted on an abnormal level.

This monitoring algorithm is formed by, e.g., an algorithm describing method such as a source file or set file using a programming grammar by using a PC or the like. It is also possible to form an algorithm that requests the center 6 to transmit data necessary for monitoring as needed.

The operational algorithm is formed by a source code that defines, e.g., an operational procedure of solving a problem corresponding to the performance and processing form of each object to be monitored. To this end, data concerning the operation of an object to be monitored is obtained in advance, and an operational algorithm for operating the object is formed.

As the operational algorithm, an algorithm for outputting a command for testing a function to be diagnosed of an object to be monitored is added to a general operational procedure of the object. Since objects to be monitored have different operational procedures, different operational algorithms are often formed for the monitoring diagnostic units 4-1, . . . of individual objects to be monitored. Also, when monitoring an object to be monitored by using a parameter or threshold value, an algorithm for outputting a command for adjusting the parameter or threshold value is added. In this case, the simplest algorithm is an algorithm that increases or decreases a parameter or threshold value at a certain predetermined low ratio.

The algorithm is formed by, e.g., an algorithm describing method such as a source file or set file using a programming grammar, or a describing method such as a flowchart, by using a PC or the like.

The analysis/diagnostic algorithm formation unit 11a individually forms the monitoring algorithm, diagnostic algorithm, and operational algorithm, and sends them to the mobile program group formation unit 12a.

On the basis of the monitoring algorithm, diagnostic algorithm, and operational algorithm formed by the analysis/diagnostic algorithm formation unit 11a, the mobile program group formation unit 12a forms mobile programs executable by the monitoring diagnostic units 4-1, . . . of the objects to be monitored.

Each of the mobile programs for monitoring, diagnosis, and operation is formed by adding, to a program for purely executing an algorithm, a subroutine for referring to input data (e.g., a mobile program), a subroutine for outputting, e.g., the monitoring data and diagnostic result, a subroutine for exchanging data with another program such as an OS, and the like. The output format of the program can be any format as long as it can be executed by the monitoring diagnostic units 4-1, . . . of objects to be monitored. Examples are a directly executable program file, and a file formed on the basis of a description language for forming a Web page or Soap (Simple object access protocol).

The mobile program group transmitter 13a attaches identification data to the individual monitoring mobile program, diagnostic mobile program, and operational mobile program formed by the mobile program group formation unit 12a, and transmits these programs to the monitoring diagnostic units 4-1, . . . of the corresponding objects to be monitored across the communication network 3.

On the other hand, the monitoring diagnostic units 4-1, . . . of the objects to be monitored each have a diagnostic result transmitter 33 and data transmitter 34 similar to those of the first and second embodiments, in addition to a mobile program group receiver 31*a* and mobile program group execution processor 32*a*.

If the identification data attached to the mobile programs is self-identification data, the mobile program group receiver 31*a* receives the individually transmitted monitoring mobile program, diagnostic mobile program, and operational mobile program, and stores them in a program memory or an appropriate storage means. The mobile program group receiver 31*a* receives these programs in accordance with the communication protocol used in the mobile program group transmitter 13*a*.

When executing each mobile program, if the mobile program is an executable file such as an EXE file, the mobile program group execution processor 32*a* executes the file.

The mobile program group execution processor 32*a* executes the monitoring mobile program, diagnostic mobile program, and operational mobile program. These mobile programs have, e.g., the following functions.

(Monitoring Mobile Program)

The monitoring mobile program monitors monitoring data of an object to be monitored, and transmits monitoring data necessary for the center 6 to the center 6 via the data transmitter 34. On the basis of the received monitoring data, the prevention/maintenance support information formation unit 15 of the center 6 converts the change in deterioration and the state of performance deterioration of the object to be monitored into numerical values, thereby forming prevention/maintenance support information.

(Diagnostic Mobile Program)

The diagnostic mobile program diagnoses the state of an object to be monitored from monitoring data of a sensor or the like. That is, on the basis of monitoring data of an object to be monitored, the diagnostic mobile program diagnoses the current status of the object, and diagnoses a low-, medium-, or high-level abnormality from the diagnostic result.

The diagnostic result is transmitted to the center 6 via the diagnostic result transmitter 33. The prevention/maintenance support information formation unit 15 of the center 6 grasps the status of the object from the received diagnostic result, reflects the status on prevention/maintenance support information, and sends the information to the prevention/maintenance plan optimization processor 16. The prevention/maintenance plan optimization processor 16 makes an optimum prevention/maintenance plan as described previously by interacting with a human system.

(Operational Mobile Program)

The operational mobile program outputs a command for obtaining an output from each sensor of an object to be monitored for each predetermined period, conducts a test on the function of an object to be monitored as needed in order to perform diagnosis or improve the operation of the object, and outputs a command for changing a parameter or threshold value.

The mobile program group execution processor 32*a* sends a necessary diagnostic result obtained by execution of the diagnostic mobile program to the diagnostic result transmitter 33, and sends monitoring data required for the center 6 to the data transmitter 34.

The diagnostic result transmitter 33 transmits the diagnostic result obtained by execution of the diagnostic mobile program to the center 6 across the communication network 3. The data transmitter 34 transmits the monitoring data required for the center 6 to the center 6 across the communication network 3. The diagnostic result and monitoring data are transmitted by using, e.g., a protocol similar to the communication protocol of the mobile program group transmitter 13*a* of the center 6.

Accordingly, the embodiment as described above achieves the same effects as in the second embodiment. In addition, the monitoring mobile program, diagnostic mobile program, and operational mobile program are individually formed and transmitted to the monitoring diagnostic units 4-1, . . . of necessary objects to be monitored. When changing only monitoring, diagnosis, or operation of each of the monitoring diagnostic units 4-1, . . . , therefore, it is only necessary to form a mobile program for the change, and transmit the program to the corresponding one of the monitoring diagnostic units 4-1, . . . This makes it possible to relatively easily and rapidly provide an individual mobile program in accordance with a request from each monitoring diagnostic unit 4.

(Fourth Embodiment)

FIG. 4 is a block diagram of a remote monitoring diagnostic system according to the fourth embodiment.

In this remote monitoring diagnostic system, a center 6 and monitoring diagnostic units 4-1, . . . of a number of objects to be monitored are connected by a communication network 3 as in the second and third embodiments.

The center 6 is obtained by adding a monitoring data transmission command output unit 17 to the same arrangement as that of the third embodiment. Note that an analysis/diagnostic algorithm formation unit 11*a*, mobile program group formation unit 12*a*, mobile program group transmitter 13*a*, prevention/maintenance support information formation unit 15, and prevention/maintenance plan optimization processor 16 are the same as those of the second and third embodiments, so a repetitive explanation will be omitted.

The monitoring data transmission command output unit 17 outputs, as needed, a monitoring data request command for acquiring necessary monitoring data of an object to be monitored from a monitoring diagnostic unit, e.g., 4-1, of the object across the communication network 3.

On the other hand, the monitoring diagnostic units 4-1, . . . of objects to be monitored each have a monitoring data transmission command receiver 35 in addition to constituent elements 31*a*, 32*a*, 33, 34 similar to those shown in FIG. 3. Since the constituent elements 31*a*, 32*a*, 33, 34 are the same as those of the third embodiment, a repetitive explanation will be omitted.

The monitoring data transmission command receiver 35 receives the monitoring data request command transmitted from the monitoring data transmission command output unit 17 of the monitoring center 6, and inputs the command to a mobile program group execution processor 32*a*. If the mobile program group execution processor 32*a* interrupts the monitoring mobile program or determines that there is a data request command on the basis of data request command presence/absence determination defined in the processing routine of the monitoring mobile program, the mobile program group execution processor 32*a* collects all necessary monitoring data, and transmits the data from the data transmitter 34 to the center 6. The center 6 receives the collected monitoring data by the prevention/maintenance support information formation unit 15, and forms and outputs prevention/maintenance support information as described earlier.

Accordingly, the embodiment as described above achieves the same functions and effects as those of the second and third embodiments. In addition, on the basis of arbitrary determination by the center 6, it is possible to obtain necessary monitoring data from the monitoring diagnostic units 4-1, . . . of necessary objects to be monitored as needed.

Consequently, each of the monitoring diagnostic units 4-1, ... of the objects to be monitored can transmit minimum necessary monitoring data to the center 6 under normal conditions, and can transmit necessary monitoring data in response to a transmission request form the center 6. Therefore, even when a large number of objects to be monitored are connected to increase the load on the communication network 3, the load on the communication network 3 under the normal conditions can be minimized.

(Fifth Embodiment)

Figure 5:
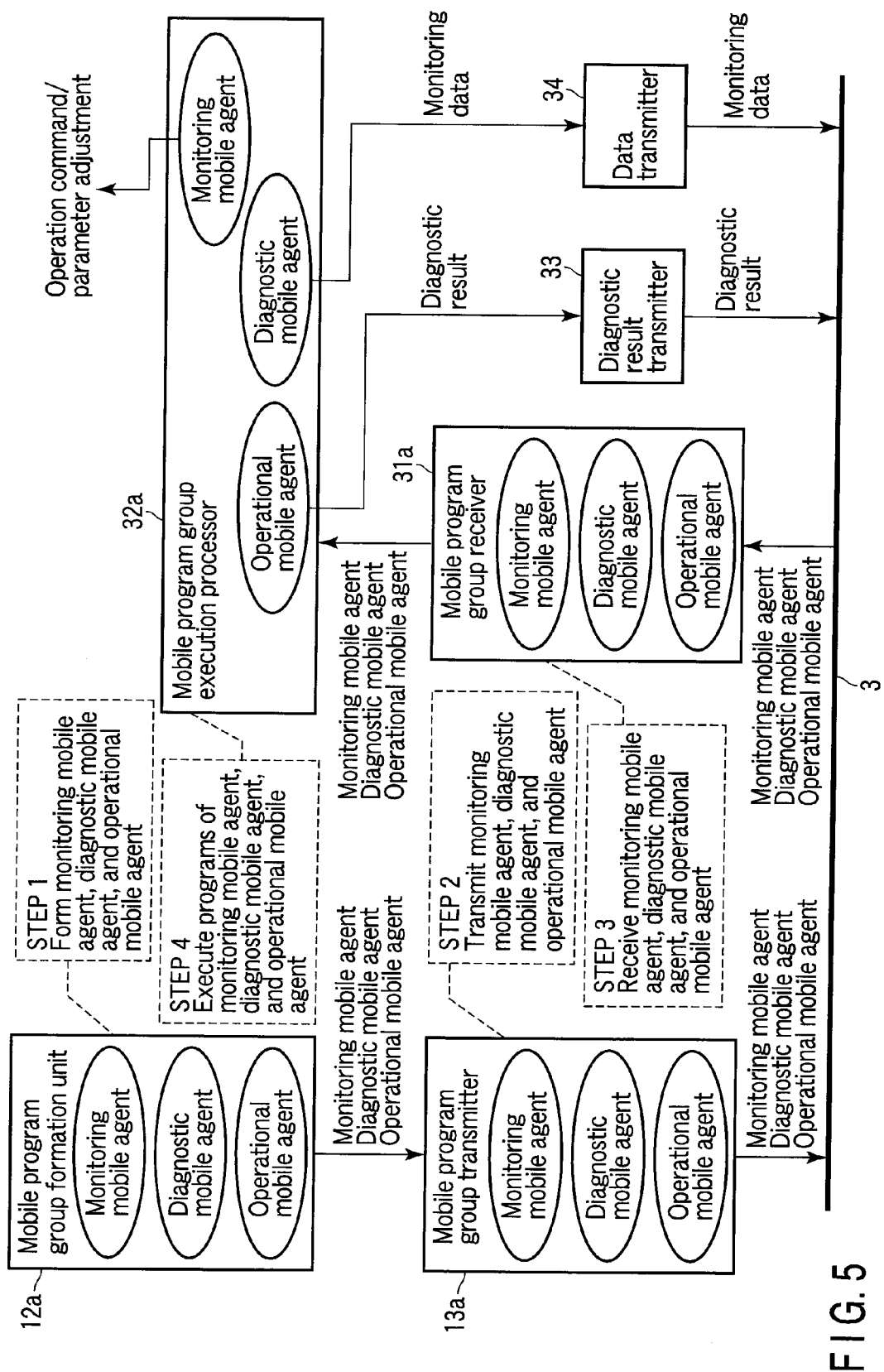
FIG. 5 is a block diagram of a remote monitoring diagnostic system according to the fifth embodiment.

FIG. 5 is a block diagram of a remote monitoring diagnostic system according to the fifth embodiment.

This remote monitoring diagnostic system has an arrangement in which a mobile program group formation unit 12a of the third and fourth embodiments forms a monitoring mobile program, diagnostic mobile program, and operational mobile program as a monitoring mobile agent, diagnostic mobile agent, and operational mobile agent, respectively, and transmits these agents to monitoring diagnostic units 4-1, ... of objects to be monitored via a mobile program group transmitter 13a and network 3.

In each of the monitoring diagnostic units 4-1, ... of the objects to be monitored, the individual monitoring mobile agent, diagnostic mobile agent, and operational mobile agent are received, and a mobile program group execution processor 32a performs execution in accordance with these mobile agents.

Each mobile agent is given a function of executing necessary processing on the basis of autonomous determination while understanding the user's intention, and formed by using, e.g., Java (registered trademark), XML, or an agent communication language (ACL). The mobile agent can (a) autonomously move and operate, (b) cooperate with another agent, (c) adapt itself to changes in the surroundings, and (d) spontaneously perform work.

The mobile program group execution processor 32a has an agent execution environment, and executes the monitoring, diagnostic, and operational mobile agents.

(Mobile Agents)

Processing pertaining to the mobile agents will be explained below.

Step 1: The mobile program group formation unit 12a forms a monitoring mobile agent, diagnostic mobile agent, and operational mobile agent from monitoring, diagnostic, and operational algorithms, respectively, and sends these mobile agents to the mobile program group transmitter 13a on the basis of an output command. Note that each mobile agent is formed by using, e.g., an agent describing source code.

Step 2: Upon receiving the mobile agents (monitoring mobile agent, diagnostic mobile agent, and operational mobile agent), the mobile program group transmitter 13a transmits these mobile agents across the network 3 to the monitoring diagnostic units 4-1, ... of objects to be monitored.

Step 3: A mobile program group receiver 31a of each of the monitoring diagnostic units 4-1, ... receives the mobile agents transmitted from the mobile program group transmitter 13a of the center 6, and stores the mobile agents in an appropriate storage means. Each mobile agent is received by, e.g., an agent describing source file.

Step 4: In the agent execution environment, the mobile program group execution processor 32a executes the mobile agents received by the mobile program group receiver 31a. In this case, each agent being executed is executing an operation. That is, the monitoring mobile agent executes an operation such as monitoring data transmission, the diagnostic mobile agent executes an operation of executing diagnosis and transmitting the diagnostic result, and the operational mobile agent executes an operation of, e.g., outputting a command for testing the function of an object to be monitored or updating a parameter or threshold value as needed.

The operations of constituent elements 33 and 34 of each of the monitoring diagnostic units 4-1, ... of objects to be monitored are the same as those described above, so a repetitive explanation will be omitted.

Accordingly, the embodiment as described above achieves the functions and effects as those of the second to fourth embodiments. In addition, the monitoring mobile agent, diagnostic mobile agent, and operational mobile agent corresponding to, e.g., the processing form and performance of each object to be monitored are formed in the center 6 and provided to the corresponding one of the monitoring diagnostic units 4-1, ... of the objects to be monitored. Therefore, each of the monitoring diagnostic units 4-1, ... of the objects to be monitored can perform monitoring, diagnosis, and operation on the basis of autonomous determination by the individual mobile agents, and transmit necessary data to the center 6 as needed, thereby reflecting the data on prevention/maintenance support information.

(Hardware Configuration)

FIG. 6 is a view showing hardware configurations for implementing each embodiment described above.

Figure 6A:
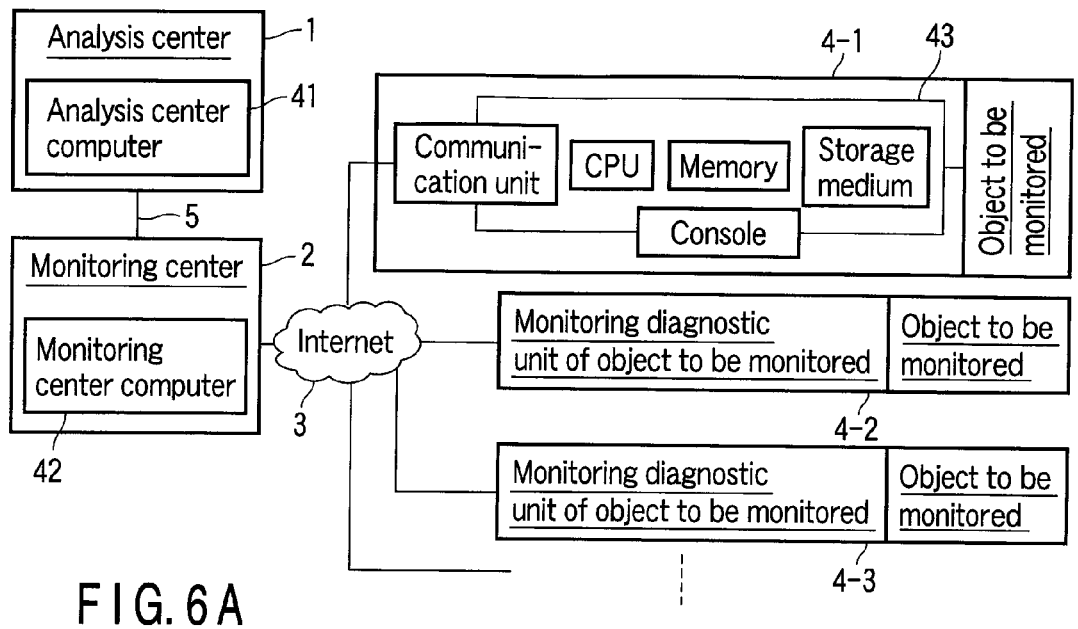
FIGS. 6A and 6B are views showing examples of hardware configurations for implementing the remote monitoring diagnostic system according to each embodiment.

FIG. 6(A) shows a hardware configuration corresponding to the arrangement of the remote monitoring diagnostic system shown in FIG. 1. That is, a monitoring center 2 and monitoring diagnostic units 4-1, 4-2, 4-3, ... of a number of objects to be monitored are connected to a communication network 3 such as the Internet. An analysis center 1 is connected to the monitoring center 2 via an intranet 5.

An analysis center computer 41 is installed in the analysis center 1, and has an analysis/diagnostic algorithm formation unit 11 shown in FIG. 1.

A monitoring center computer 42 is installed in the monitoring center 2, and functionally has a mobile program formation unit 12 and mobile program transmitter 13 shown in FIG. 1.

A computer such as a general PC or a board microcomputer 43 is installed in each of the monitoring diagnostic units 4-1, 4-2, 4-3, ... of the objects to be monitored.

The computer or board microcomputer 43 comprises, e.g., a communication means, a CPU, a memory for storing data of program execution results and the like, a storage medium for storing mobile programs, and a console having a man-machine interface function.

The computer such as a PC is connected to objects to be monitored by, e.g., RS-232C, and can communicate with these objects. When the board microcomputer is used, this board microcomputer is incorporated into, e.g., an object to be monitored. When an object to be monitored has a computer function, this computer function of the object itself is sometimes used.

The computer such as a PC or the board microcomputer 43 is almost the same as the monitoring center computer 32, except that necessary instruction data is input from the console and data is checked on the console instead of using input means such as a keyboard and mouse.

Figure 6B:
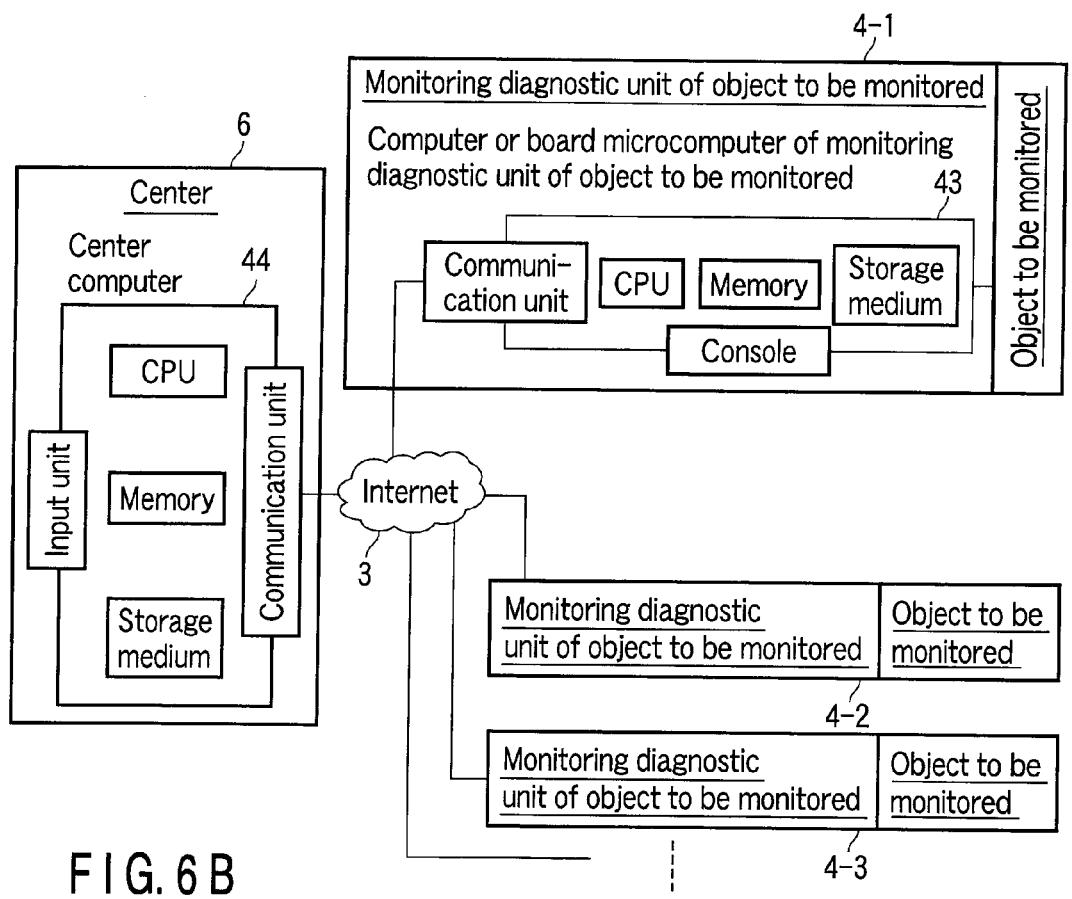

FIG. 6(B) shows a hardware configuration corresponding to the arrangement of the remote monitoring diagnostic system shown in any of FIGS. 2 to 5 described above. That is, a center 6 and monitoring diagnostic units 4-1, 4-2, 4-3, ... of a number of objects to be monitored are connected to a communication network 3 such as the Internet.

A center computer 44 is installed in the center 6. A computer such as a general PC is used as the center computer 44. The center computer 44 has a communication means, a CPU, a memory for storing data of program execution results and the like, a recording medium for storing mobile programs or mobile agents, and input means such as a keyboard and mouse. In particular, the memory or storage medium stores and manages algorithms and mobile programs of a number of objects to be monitored, and hence has the function of a database.

The center computer 44 functionally has an analysis/diagnostic algorithm formation unit 11, mobile program formation unit 12, mobile program transmitter 13, prevention/maintenance support information formation unit 15, and prevention/maintenance plan optimization processor 16 shown in FIG. 2.

Also, the center computer 44 functionally has an analysis/diagnostic algorithm formation unit 11*a*, mobile program group formation unit 12*a*, mobile program group transmitter 13*a*, and monitoring data transmission command output unit 17 shown in FIGS. 3 to 5.

The monitoring diagnostic units 4-1, 4-2, 4-3, . . . of objects to be monitored each have the same hardware configuration as that shown in FIG. 6(A).

Note that the hardware configuration shown in FIG. 6(B) is similarly applicable to each embodiment to be explained below.

(Sixth Embodiment)

Figure 7:
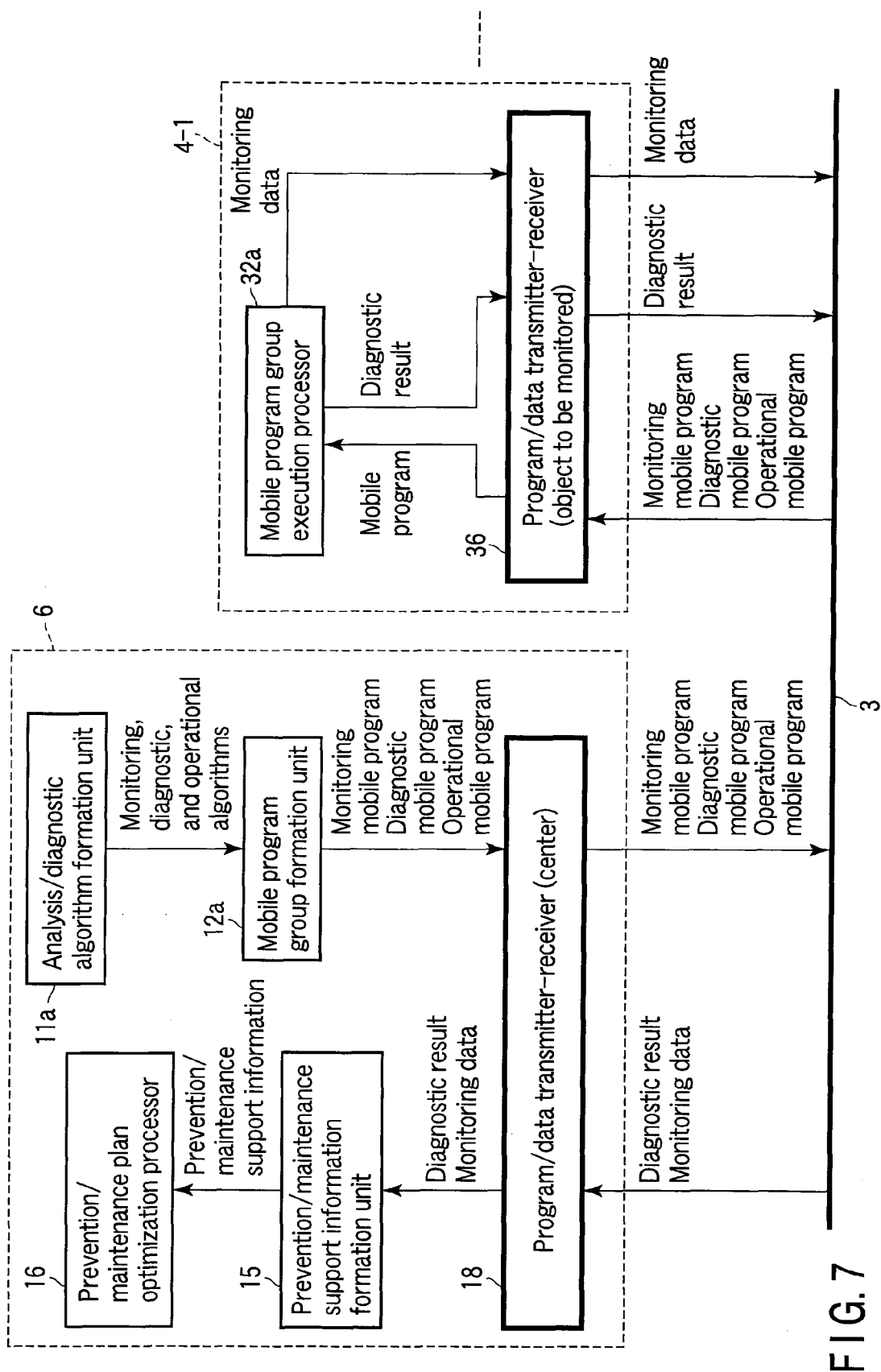
FIG. 7 is a block diagram of a remote monitoring diagnostic system according to the sixth embodiment.

FIG. 7 is a block diagram of a remote monitoring diagnostic system according to the sixth embodiment.

In this remote monitoring diagnostic system, a center 6 and monitoring diagnostic units 4-1, . . . of a number of objects to be monitored are connected by a communication network 3 as in the third and fourth embodiments.

The center 6 has a program/data transmitter-receiver 18 in addition to an analysis/diagnostic algorithm formation unit 11*a*, mobile program group formation unit 12*a*, prevention/maintenance support information formation unit 15, and prevention/maintenance plan optimization processor 16.

The analysis/diagnostic algorithm formation unit 11*a*, mobile program group formation unit 12*a*, prevention/maintenance support information formation unit 15, and prevention/maintenance plan optimization processor 16 are the same as those of the embodiments described above, so a repetitive explanation will be omitted.

The monitoring diagnostic units 4-1, . . . of the objects to be monitored each have a mobile program (agent) group execution processor 32*a* and program/data transmitter-receiver 36. The mobile program group execution processor 32*a* is the same as that of the embodiments described above, so a repetitive explanation will be omitted.

This embodiment differs from the above-mentioned embodiments in that the center 6 has the program/data transmitter-receiver 18, and each of the monitoring diagnostic units 4-1, . . . of the objects to be monitored has a program/data transmitter-receiver 36.

The program/data transmitter-receiver 18 of the center 6 receives mobile programs (a monitoring mobile program, diagnostic mobile program, and operational mobile program) formed by the mobile program group formation unit 12*a*, attaches transmission destination identification data to these mobile programs, and transmits the mobile programs to the monitoring diagnostic units 4-1, . . . of the objects to be monitored across the communication network 3 by using a predetermined communication protocol. Note that as the mobile programs, it is also possible to transmit one of the monitoring mobile program, diagnostic mobile program, and operational mobile program in accordance with requests from the monitoring diagnostic units 4-1, . . . of the objects to be monitored.

Also, the program/data transmitter-receiver 18 receives monitoring results and monitoring data transmitted across the communication network 3 from the monitoring diagnostic units 4-1, . . . of the objects to be monitored, and sends the results and data to the prevention/maintenance support information formation unit 15.

The program/data transmitter-receiver 36 of each of the monitoring diagnostic units 4-1, . . . of the objects to be monitored receives, on the basis of the transmission destination identification data, the mobile programs (monitoring mobile program, diagnostic mobile program, and operational mobile program) transmitted from the program/data transmitter-receiver 18 of the center 6, and stores these mobile programs in an appropriate storage means.

The mobile program group execution processor 32*a* executes the mobile program group, e.g., the monitoring mobile program received by the program/data transmitter-receiver 36, and transmits monitoring data as the monitoring result to the center 6 as needed. Also, the mobile program group execution processor 32*a* executes, e.g., the diagnostic mobile program, and transmits the diagnostic result to the center 6.

That is, the program/data transmitter-receiver 18 is obtained by collecting all the transmission/reception systems of the center 6 into one package. Therefore, the program/data transmitter-receiver 18 can be flexibly incorporated into the center 6, and can flexibly deal with changes in communication protocols. The program/data transmitter-receiver 36 also has the same function.

Accordingly, the embodiment as described above achieves the same functions and effects as those of the above-mentioned embodiments. In addition, the program/data transmitter-receivers 18 and 36 are respectively obtained by collecting all the transmission/reception systems of the center 6 and the monitoring diagnostic units 4-1, . . . of the objects to be monitored into standard packages. Therefore, the program/data transmitter-receivers 18 and 36 can be readily incorporated into the center 6 and the monitoring diagnostic units 4-1, . . . of the objects to be monitored, respectively.

Also, since the transmission/reception systems are collectively incorporated as a package, if a communication protocol or the like is changed, transmission/reception systems based on the communication protocol need only be collectively replaced. This facilitates updating and maintaining the transmission/reception systems.

(Seventh Embodiment)

Figure 8:
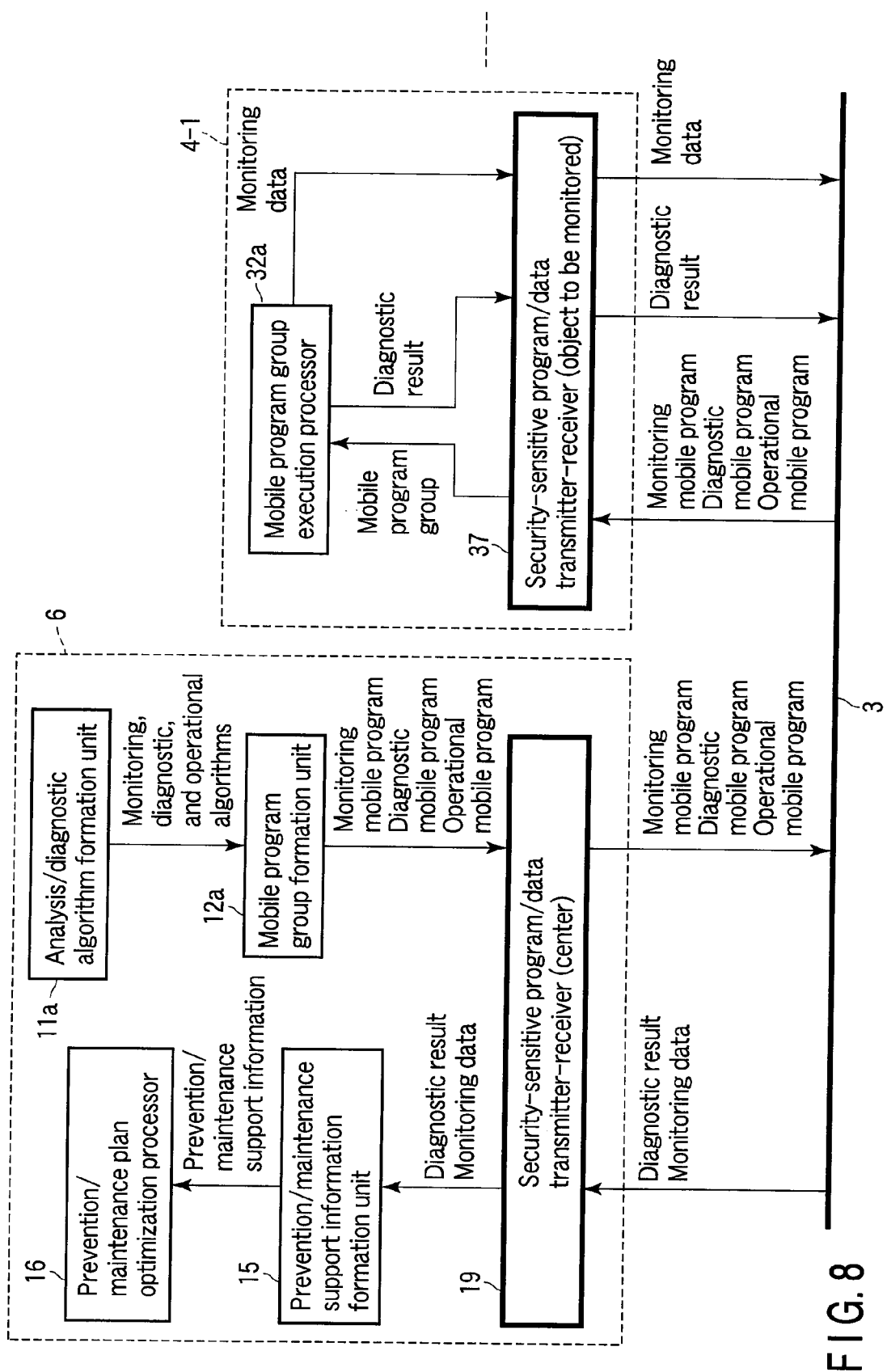
FIG. 8 is a block diagram of a remote monitoring diagnostic system according to the seventh embodiment.

FIG. 8 is a block diagram of a remote monitoring diagnostic system according to the seventh embodiment.

This embodiment has an arrangement in which the program/data transmitter-receiver 18 of the center 6 and the program/data transmitter-receiver 36 of each of the monitoring diagnostic units 4-1, . . . of the objects to be monitored shown in FIG. 7 are respectively replaced with a security-sensitive program/data transmitter-receiver 19 and security-sensitive program/data transmitter-receiver 37. Accordingly, the rest of the arrangement is the same as that of the embodiments described above, so a repetitive explanation will be omitted.

The security-sensitive program/data transmitter-receiver 19 of a center 6 receives a mobile program group (a monitoring mobile program, diagnostic mobile program, and operational mobile program) formed by a mobile program group formation unit 12*a*, attaches transmission destination identification data to these mobile programs, and transmits the mobile programs to monitoring diagnostic units 4-1, . . . of objects to be monitored across a network 3 by using a predetermined communication protocol. Note that as the mobile program group, it is also possible to transmit one of the monitoring mobile program, diagnostic mobile program, and operational mobile program in accordance with requests from the monitoring diagnostic units 4-1, . . . of the objects to be monitored.

The security-sensitive program/data transmitter-receiver 19 incorporates authentication software and encryption software. After obtaining authentication indicating that the monitoring diagnostic units 4-1, . . . of the objects to be monitored as the transmission destinations are security-sensitive, the security-sensitive program/data transmitter-receiver 19 transmits the mobile program group as encrypted data.

Also, the security-sensitive program/data transmitter-receiver 19 receives monitoring results and monitoring data transmitted across the network 3 from the monitoring diagnostic units 4-1, . . . of the objects to be monitored, and sends the results and data to a prevention/maintenance support information formation unit 15. Since the security-sensitive program/data transmitter-receiver 37 transmits an encrypted monitoring result and monitoring data after obtaining authentication indicating that the security-sensitive program/data transmitter/receiver 19 of the center 6 as the transmission destination is security-sensitive, the security-sensitive program/data transmitter-receiver 19 decrypts the monitoring result and monitoring data, and sends them to the prevention/maintenance support information formation unit 15.

On the other hand, the security-sensitive program/data transmitter-receiver 37 of each of the monitoring diagnostic units 4-1, . . . of the objects to be monitored receives, on the basis of the transmission destination identification data, the mobile program group (monitoring mobile program, diagnostic mobile program, and operational mobile program) transmitted from the security-sensitive program/data transmitter-receiver 19 of the center 6. After authenticating that the center 6 is absolutely the transmission source, the security-sensitive program/data transmitter-receiver 37 decrypts the received encrypted mobile program group, stores them in an appropriate storage unit.

A mobile program group execution processor 32a executes the mobile program group, e.g., the monitoring mobile program received by the security-sensitive program/data transmitter-receiver 37, and transmits monitoring data as the monitoring result to the center 6 as needed. In this case, the mobile program group execution processor 32a encrypts the monitoring data and transmits the data after authenticating that the transmission destination is security-sensitive. The mobile program group execution processor 32a executes the diagnostic mobile program, and transmits the diagnostic result to the center 6. In this case, the mobile program group execution processor 32a authenticates that the transmission destination is security-sensitive, and then transmits the monitoring data after encrypting it.

Accordingly, the embodiment as described above achieves the same functions and effects as those of the above-mentioned embodiments. In addition, a security function is given to only the security-sensitive program/data transmitter-receivers 19 and 37 as transmission/reception systems. This facilitates authentication, encryption/decryption.

Also, the program/data transmitter-receivers 19 and 37 including the authenticating function and encrypting/decrypting function can be collected into standard packages, and these packages can be easily used as they are incorporated into the center 6 and the monitoring diagnostic units 4-1, . . . of the objects to be monitored. This reduces the load on application or implantation to the system, and facilitates incorporating the transmission/reception systems including the security function that frequently undergoes version up into one package.

(Eighth Embodiment)

Figure 9:
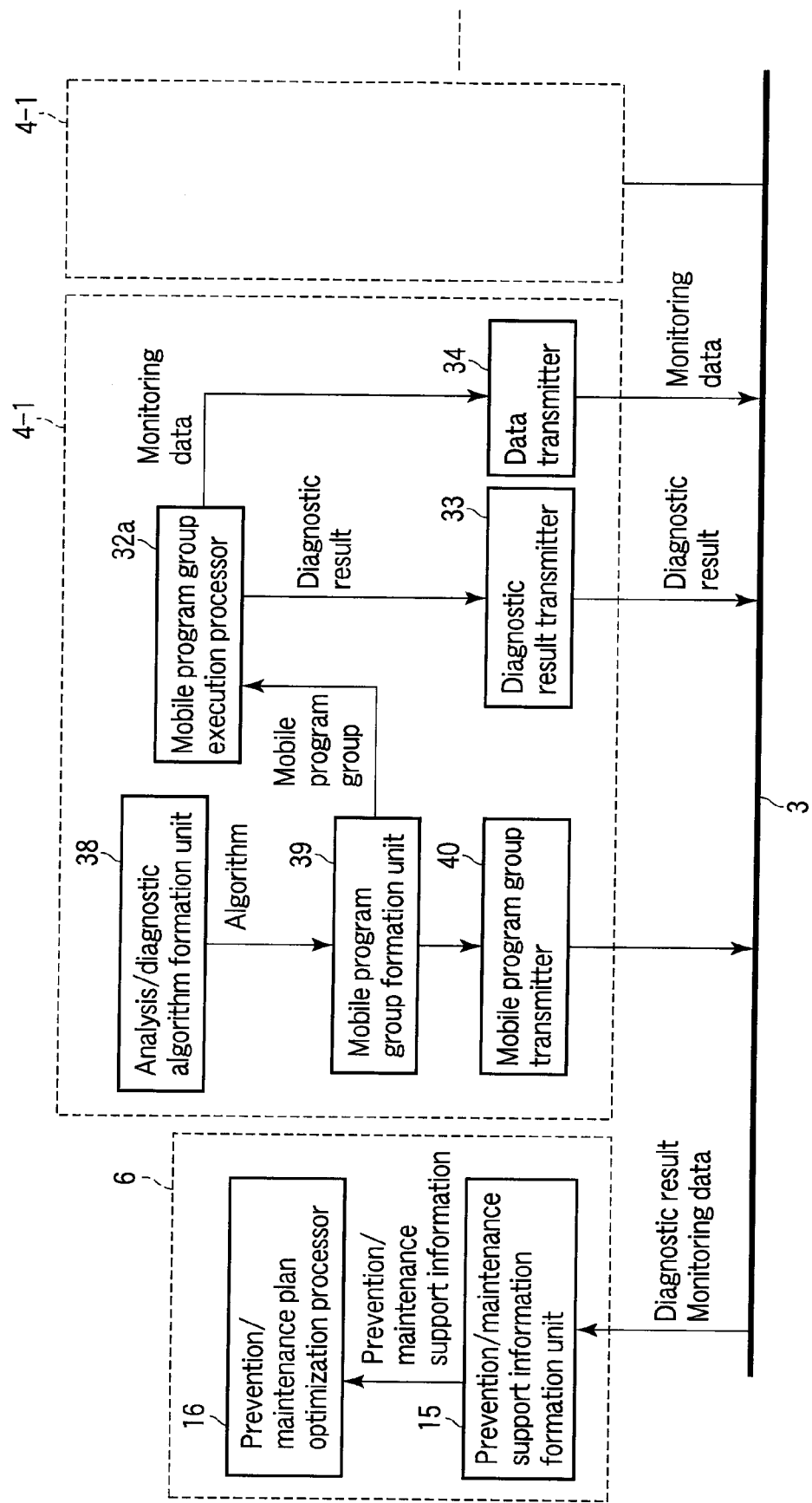
FIG. 9 is a block diagram of a remote monitoring diagnostic system according to the eighth embodiment.

FIG. 9 is a block diagram of a remote monitoring diagnostic system according to the eighth embodiment.

In this embodiment, a center 6 and monitoring diagnostic units 4-1, . . . of a number of objects to be monitored are connected by a communication network 3. Of the monitoring diagnostic units 4-1, . . . of the many objects to be monitored, a master function is imparted to the monitoring diagnostic unit, e.g., 4-1, of only one object to be monitored. In this system, the center 6 exclusively uses this monitoring diagnostic unit to make a prevention/maintenance plan.

That is, the center 6 has a prevention/maintenance support information formation unit 15 and prevention/maintenance plan optimization processor 16. The prevention/maintenance support information formation unit 15 and prevention/maintenance plan optimization processor 16 are the same as those of the second embodiment, so a repetitive explanation will be omitted.

On the other hand, the monitoring diagnostic unit (e.g., 4-1) with the master function of one object to be monitored additionally has an analysis/diagnostic algorithm formation unit 38, mobile program group formation unit 39, and mobile program group transmitter 40. The monitoring diagnostic unit 4-1 forms a mobile program, and executes the mobile program by its own mobile program group execution processor 32a. The monitoring diagnostic unit 4-1 also forms a mobile program different in processing form or performance for a monitoring diagnostic unit, e.g., 4-i (i=2, 3, . . . ) of an object to be monitored except for the monitoring diagnostic unit 4-1. In response to a request from a monitoring diagnostic unit, e.g., 4-i (i=2, 3, . . . ) of an object to be monitored, the monitoring diagnostic unit 4-1 transmits the mobile program to the corresponding monitoring diagnostic unit, e.g., 4-2.

That is, the analysis/diagnostic algorithm formation unit 38, mobile program group formation unit 39, and mobile program group transmitter 40 have the same functions as those of the analysis/diagnostic algorithm formation unit 11, mobile program group formation unit 12a, and mobile program group transmitter 13a described above, so a repetitive explanation will be omitted.

In this embodiment, therefore, the monitoring diagnostic unit having the master function, e.g., 4-1, of one object to be monitored practically plays the same role as that of the center 6 of each embodiment described above. Accordingly, the center 6 can exclusively collect data concerning maintenance and support, thereby inspecting and maintaining each object to be monitored.

(Ninth Embodiment)

Figure 10:
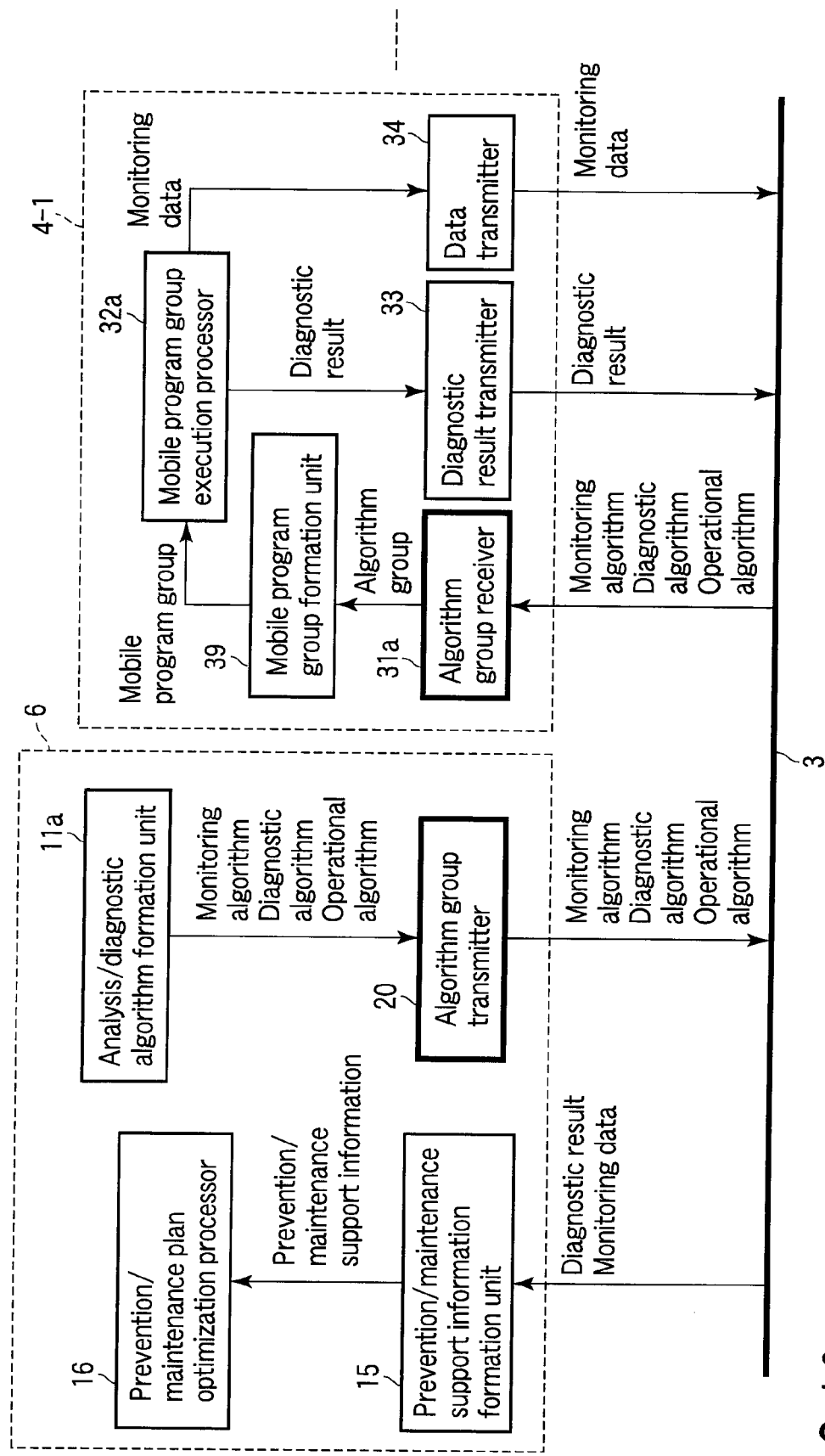
FIG. 10 is a block diagram of a remote monitoring diagnostic system according to the ninth embodiment.

FIG. 10 is a block diagram of a remote monitoring diagnostic system according to the ninth embodiment.

In this remote monitoring diagnostic system, a center 6 and monitoring diagnostic units 4-1, . . . of a number of objects to be monitored are connected by a communication network 3. The center 6 has an analysis/diagnostic algorithm formation unit 11a, algorithm group transmitter 20, prevention/maintenance support information formation unit 15, and prevention/maintenance plan optimization processor 16.

The analysis/diagnostic algorithm formation unit 11a, prevention/maintenance support information formation unit 15, and prevention/maintenance plan optimization processor 16 are the same as those of the embodiments described above, so a repetitive explanation will be omitted.

On the other hand, monitoring diagnostic units 4-1, . . . of the objects to be monitored each have an algorithm group receiver 31*a*, mobile program group formation unit 39, mobile program group execution processor 32*a*, diagnostic result transmitter 33, and data transmitter 34. The mobile program group execution processor 32*a*, diagnostic result transmitter 33, and data transmitter 34 are the same as those of the embodiments described above, so a repetitive explanation will be omitted.

As in the third embodiment, the analysis/diagnostic algorithm formation unit 11*a* forms a monitoring algorithm, diagnostic algorithm, and operational algorithm, and transfers them to the algorithm group transmitter 20.

The algorithm group transmitter 20 converts the monitoring, diagnostic, and operational algorithms formed by the analysis/diagnostic algorithm formation unit 11*a* into source files of a predetermined programming language (e.g., the JAVA (registered trademark) language), attaches transmission destination identification data to these source files, and transmits them to the monitoring diagnostic units 4-1, . . . of the objects to be monitored across the network 3.

The algorithm group receiver 31*a* of each of the monitoring diagnostic units 4-1, . . . of the objects to be monitored receives the monitoring, diagnostic, and operational algorithms in the form of source files transmitted from the center 6, and sends these algorithms to the mobile program group formation unit 39. The mobile program group formation unit 39 compiles the monitoring, diagnostic, and operational algorithms in the form of source files, thereby forming a mobile program group (a monitoring mobile program, diagnostic mobile program, and operational mobile program). The mobile program group formation unit 39 has the same function as that of the mobile program group formation unit 12*a* of the third embodiment.

In this embodiment, the center 6 forms monitoring, diagnostic, and operational algorithms and transmits them in the form of files in accordance with the processing form or performance of the monitoring diagnostic units 4-1, . . . of the objects to be monitored, e.g., if the monitoring diagnostic units 4-1, . . . have a program formation processing function.
(10th Embodiment)

Figure 11:
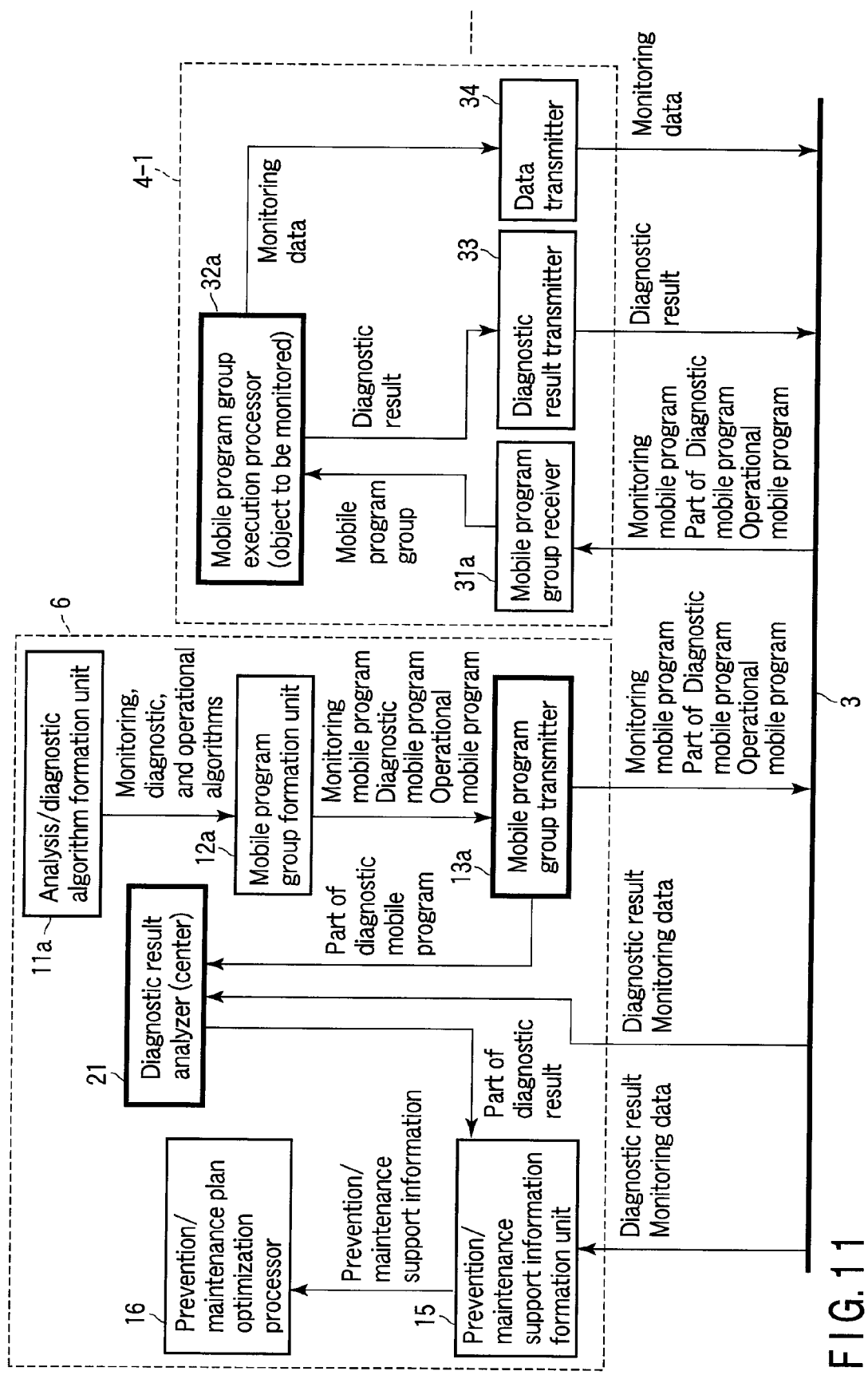
FIG. 11 is a block diagram of a remote monitoring diagnostic system according to the 10th embodiment.

FIG. 11 is a block diagram of a remote monitoring diagnostic system according to the 10th embodiment.

In this remote monitoring diagnostic system, a center 6 and monitoring diagnostic units 4-1, . . . of a number of objects to be monitored are connected by a communication network 3.

The center 6 has an arrangement obtained by adding a diagnostic result analyzer 21 to the arrangement of the third embodiment. The diagnostic result analyzer 21 is used because if the performance of monitoring diagnostic units 4-1, . . . of the objects to be monitored is low, the diagnostic results are complementarily analyzed on the side of the center 6 and reflected on prevention/maintenance support information.

Note that an analysis/diagnostic algorithm formation unit 11*a*, mobile program group formation unit 12*a*, and mobile program group transmitter 13*a* have the same functions as those of the first to fourth embodiments. Note also that the monitoring diagnostic units 4-1, . . . of the objects to be monitored each have the same arrangement as that of the first to fourth embodiments.

The diagnostic result analyzer 21 saves and manages, over a few years, diagnostic mobile programs formed by the mobile program group formation unit 12*a* and diagnostic results and monitoring data as the results of execution of the diagnostic mobile programs, and receives and saves prevention/maintenance support information obtained by reflecting a part of the analytical results as needed. The diagnostic result analyzer 21 receives diagnostic results and monitoring data as the results of execution from the monitoring diagnostic units 4-1, . . . by the newest diagnostic mobile program formed by the mobile program group formation unit 12*a*, and acquires a diagnostic result indicating performance deficiency by using, e.g., a simulation model using the newest diagnostic mobile program. On the basis of this diagnostic result, the diagnostic result analyzer 21 refers to already managed and saved past diagnostic results and monitoring data having high similarity, and finds, e.g., the deterioration of a constituent part of an object to be monitored, the decrease in capability of an object to be monitored, or a light-, medium-, or high-level abnormality. The diagnostic result analyzer 21 sends the found data to a prevention/maintenance support information formation unit 15, thereby reflecting the data on prevention/maintenance support information.

In this embodiment, diagnostic results as the results of execution of the diagnostic mobile program as a part of mobile programs are acquired in accordance with the performance of the monitoring diagnostic units 4-1, . . . of the objects to be monitored, and diagnosis is performed to complement the deficient performance of the monitoring diagnostic units 4-1, . . . of the objects to be monitored. The diagnostic data is supplied to the prevention/maintenance support information formation unit 15, and properly reflected on the prevention/maintenance support information.
(11th Embodiment)

Figure 12:
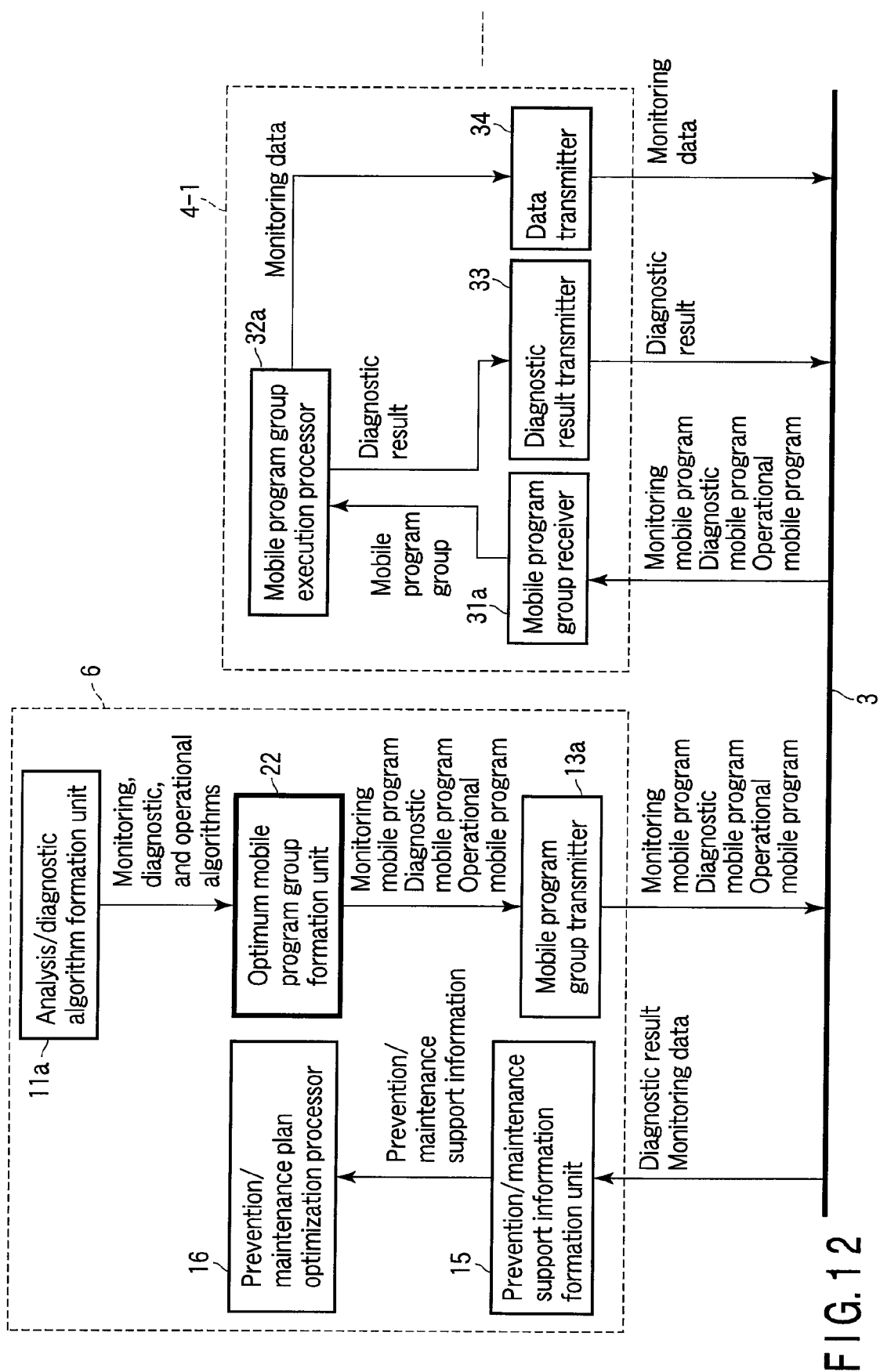
FIG. 12 is a block diagram of a remote monitoring diagnostic system according to the 11th embodiment.

FIG. 12 is a block diagram of a remote monitoring diagnostic system according to the 11th embodiment.

In this remote monitoring diagnostic system, a center 6 and monitoring diagnostic units 4-1, . . . of a number of objects to be monitored are connected by a communication network 3.

The center 6 has the same arrangement and functions as those of the third embodiment, and also has an optimum mobile program group formation processor 22 instead of the mobile program Group formation unit 12*a* described in the third embodiment.

Monitoring diagnostic units 4-1, . . . of the objects to be monitored each have the same arrangement as that of the first to fourth embodiments.

In accordance with the number of memories in the monitoring diagnostic units 4-1, . . . of the objects to be monitored, the optimum mobile program group formation processor 22 forms mobile programs (a monitoring mobile program, diagnostic mobile program, and operational mobile program) corresponding to the storage capacity, on the basis of algorithms formed by an analysis/diagnostic algorithm formation unit 11*a*.

For example, if the number of memories installed in the monitoring diagnostic units 4-1, . . . of the objects to be monitored is small, the optimum mobile program group formation processor 22 forms mobile programs that reduce the number of memories to be simultaneously used by changing the order of loop processes or branching processes, on the basis of the algorithms.

If the number of memories installed in the monitoring diagnostic units 4-1, . . . of the objects to be monitored is large and it is necessary to increase the processing speed, the optimum mobile program group formation processor 22 forms mobile programs that increase the processing speed by using a large number of memories.

The simplest example is as follows. When using a programming language, e.g., the C++ language, it is sometimes possible to perform complementary designation for optimizing a compiled program. In this case, a program is formed by changing the settings by taking into account the memories of the monitoring diagnostic units 4-1, . . . of the objects to be monitored.

The mobile programs formed by the optimum mobile program group formation processor 22 are transmitted from a mobile program group transmitter 13a to the monitoring diagnostic units 4-1, . . . of the objects to be monitored across the network 3.

The functions of the monitoring diagnostic units 4-1, . . . of the objects to be monitored are the same as those of the first to fourth embodiments, so a repetitive explanation will be omitted.

Accordingly, this embodiment can form mobile programs by taking account of the number of memories of the monitoring diagnostic units 4-1, . . . of the objects to be monitored.

Furthermore, the present invention is not limited to the above embodiments, and can be practiced in various forms without departing from the spirit and scope of the invention.

Industrial Applicability

The present invention is applicable to a large number of objects to be monitored different in processing form or performance by adopting an architecture changeable in accordance with the states of a number of objects to be monitored, and also applicable to a remote monitoring diagnostic system in which monitoring, diagnostic, and operational programs are independently processed, so a monitoring diagnostic unit of each object to be monitored can receive and execute only a necessary program.

What is claimed is:

1. A remote monitoring diagnostic system in which a center and monitoring diagnostic units each installed in an object to be monitored are connected by a communication network, and which monitors and diagnoses the object,
wherein the center comprises:
analysis and diagnostic algorithm forming means for forming an algorithm for performing diagnosis of the object, on the basis of a result of analysis performed beforehand on data or specifications of the object;
mobile program forming means for forming a mobile program for diagnosing the object, on the basis of the algorithm formed by the analysis and diagnostic algorithm forming means;
mobile program transmission means for transmitting the mobile program formed by the mobile program forming means to each monitoring diagnostic unit across the communication network;
prevention and maintenance support information forming means for receiving monitoring data and a diagnostic result of the object transmitted from a transmission means of each monitoring diagnostic unit, and forming maintenance support information of the object on the basis of the monitoring data and the diagnostic result; and
prevention and maintenance plan optimization processing means for making an optimum maintenance plan by using the prevention and maintenance support information formed, and
wherein each monitoring diagnostic unit comprises:
mobile program reception means for receiving the mobile program transmitted from the center;
mobile program execution processing means for executing the received mobile program on the object; and
transmission means for transmitting monitoring data of the object and a diagnostic result of the monitoring data to the center across the communication network.

2. A remote monitoring diagnostic system in which a center and monitoring diagnostic units each installed in an object to be monitored are connected by a communication network, and which monitors and diagnoses the object,
wherein the center comprises:
analysis and diagnostic algorithm forming means for forming an algorithm for performing diagnosis of the object, on the basis of a result of analysis performed beforehand on data or specifications of the object;
mobile program forming means for forming a mobile program for diagnosing the object, on the basis of the algorithm formed by the analysis and diagnostic algorithm forming means;
mobile program transmission means for transmitting the mobile program formed by the mobile program forming means to each monitoring diagnostic unit across the communication network;
diagnostic result reception means for receiving a diagnostic result or monitoring data transmitted from the monitoring diagnostic unit of the object, and generating an alarm or abnormality notification if abnormality is found, and
algorithm transmission means for transmitting the mobile algorithm formed by the analysis and diagnostic algorithm forming means, instead of the mobile program forming means and the mobile program transmission means, and
wherein each monitoring diagnostic unit comprises:
mobile program reception means for receiving the mobile program transmitted from the center;
mobile program execution processing means for executing the received mobile program on the object;
transmission means for transmitting monitoring data of the object and a diagnostic result of the monitoring data to the center across the communication network;
algorithm reception means for receiving the mobile algorithm transmitted across the communication network; and
mobile program forming means for forming a mobile program on the basis of the received mobile algorithm, and providing the mobile program to the mobile program execution processing means.

3. A remote monitoring diagnostic system in which a center and monitoring diagnostic units each installed in an object to be monitored are connected by a communication network, and which monitors and diagnoses the object,
wherein the center comprises:
analysis and diagnostic algorithm forming means for forming an algorithm for performing diagnosis of the object, on the basis of a result of analysis performed beforehand on data or specifications of the object;
mobile program forming means for forming a mobile program for diagnosing the object, on the basis of the algorithm formed by the analysis and diagnostic algorithm forming means;
mobile program transmission means for transmitting the mobile program formed by the mobile program forming means to each monitoring diagnostic unit across the communication network;
diagnostic result reception means for receiving a diagnostic result or monitoring data transmitted from the monitoring diagnostic unit of the object, and generating an alarm or abnormality notification if abnormality is found, and
optimum mobile program forming means for forming an optimum mobile program matching the number of memories installed in each monitoring diagnostic unit, instead of the mobile program forming means, and wherein each monitoring diagnostic unit comprises:
mobile program reception means for receiving the mobile program transmitted from the center;
mobile program execution processing means for executing the received mobile program on the object; and
transmission means for transmitting monitoring data of the object and a diagnostic result of the monitoring data to the center across the communication network.

* * * * *